(12) United States Patent
Naveen et al.

(10) Patent No.: US 7,155,033 B1
(45) Date of Patent: Dec. 26, 2006

(54) COARSE REPRESENTATION OF VISUAL OBJECT'S SHAPE FOR SEARCH/QUERY/FILTERING APPLICATIONS

(75) Inventors: Thumpudi Naveen, Redmond, WA (US); Anil M. Murching, Beaverton, OR (US); Ali Tabatabai, Beaverton, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/494,514

(22) Filed: Feb. 1, 2000

Related U.S. Application Data

(60) Provisional application No. 60/118,386, filed on Feb. 1, 1999.

(51) Int. Cl.
*G06K 9/00* (2006.01)

(52) U.S. Cl. ............... 382/108; 382/190; 382/192; 382/205; 707/7

(58) Field of Classification Search ............... 382/305, 382/108, 190, 192, 205; 707/1–7, 104.1
See application file for complete search history.

(56) References Cited

U.S. PATENT DOCUMENTS

| | | | | |
|---|---|---|---|---|
| 5,434,617 A | * | 7/1995 | Bianchi | 348/170 |
| 5,438,630 A | * | 8/1995 | Chen et al. | 382/159 |
| 5,485,531 A | * | 1/1996 | Ichinohe et al. | 382/198 |
| 5,615,285 A | * | 3/1997 | Beernink | 382/189 |
| 5,751,286 A | * | 5/1998 | Barber et al. | 715/835 |
| 5,893,095 A | * | 4/1999 | Jain et al. | 707/6 |
| 6,011,865 A | * | 1/2000 | Fujisaki et al. | 382/189 |
| 6,185,314 B1 | * | 2/2001 | Crabtree et al. | 382/103 |
| 6,263,113 B1 | * | 7/2001 | Abdel-Mottaleb et al. | 382/237 |
| 6,266,442 B1 | * | 7/2001 | Laumeyer et al. | 382/190 |
| 6,449,639 B1 | * | 9/2002 | Blumberg | 709/217 |

OTHER PUBLICATIONS

Atul Puri and Alex Eleftheriadis, "MPEG-4: An Object-Based Multimedia Coding Standard Supporting Mobile Applications," ACM Mobile Networks and Applications Journal, Special Issue on Mobile Multimedia Communications, vol. 3, Issue 1, Jun. 1998, pp. 5-32.*

William Newman and Andries Van Dam, "Recent Efforts Towards Graphics Standardization," ACM Computing Surveys, vol. 10, Issue 4, Dec. 1978, pp. 365-380.*

Gregory Baxes, Digital Image Processing: Principles and Applications, John Wiley & Sons, New York, NY, 1994.*

* cited by examiner

*Primary Examiner*—Bravesh M. Mehta
*Assistant Examiner*—John Strege
(74) *Attorney, Agent, or Firm*—Joseph J. Laks; Ronald H. Kurdyla; Joel M. Fogelson

(57) ABSTRACT

A method of coarse representation of a visual object's shape for search/query/filtering applications uses a binding box that fully encompasses the object of interest within the image to extract a feature vector. Once the feature vector is available, matching based on specific queries may be performed using a search engine to compare the query number to an appropriate element of the feature vector, performing sorting to pick the best matches.

1 Claim, 1 Drawing Sheet

COARSE REPRESENTATION OF VISUAL OBJECT'S SHAPE FOR SEARCH/QUERY/FILTERING APPLICATIONS

CROSS REFERENCE TO RELATED APPLICATIONS

This is a continuation of provisional U.S. Patent Application Ser. No. 60/118,386 filed Feb. 1, 1999, now abandoned.

BACKGROUND OF THE INVENTION

The present invention relates to video data processing, and more particularly for a coarse representation of a visual object's shape for search/query/filtering applications.

With the success of the Internet and picture and video coding standards, such as JPEG, MPEG-1, 2, more and more audio-visual information is available in digital form. Before one can use any such information, however, it first has to be located. Searching for textual information is an established technology. Many text-based search engines are available on the World Wide Web to search text documents. Searching is not yet possible for audio-visual content, since no generally recognized description of this material exists. MPEG-7 is intending to standardize the description of such content. This description is intended to be useful in performing search at a very high level or at a low level. At a high level the search may be to locate "a person wearing a white shirt walking behind a person wearing a red sweater". At lower levels for still images one may use characteristics like color, texture and information about the shape of objects in that picture. The high level queries may be mapped to the low level primitive queries to perform the search.

Visual object searches are useful in content creation, such as to locate from archive the footage from a particular event, e.g. a tanker on fire, clips containing particular public figure, etc. Also the number of digital broadcast channels is increasing every day. One search/filtering application is to be able to select the broadcast channel (radio or TV) that is potentially interesting.

What is desired is a descriptor that may be automatically or semi-automatically extracted from still images/key images of video and used in searches.

BRIEF SUMMARY OF THE INVENTION

Accordingly the present invention provides a coarse representation of a visual object's shape for search/query/filtering applications.

The objects, advantages and other novel features of the present invention are apparent from the following detailed description in view of the appended claims and attached drawing.

DETAILED DESCRIPTION OF THE INVENTION

A coarse representation of a visual object's shape may be used for searching based on the shape of the object. This representation is easy to compute, but answers a variety of queries that will be described later. However, this simple approach may not provide a very high quality shape representation, either in 2-D or 3-D. The following method may be used for visual objects in still images or in video.

Figure 1:
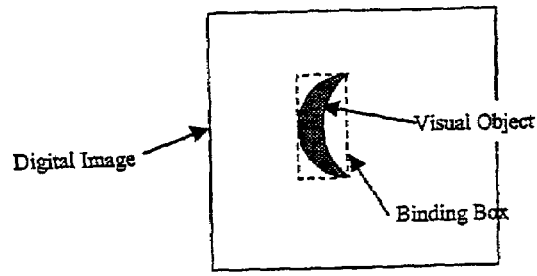
FIG. 1 is an illustrative view of a visual object within a digital image.

As shown in FIG. 1 in a coarse representation of shape, each semantic object or its sub-portions may be represented by a binding box (a rectangle) in the image. A binding box of a visual object is the tightest rectangle that fully encompasses that visual object in an image.

The parameters needed to represent the binding box are:

| |
|---|
| TopLeftCorner$_h$ |
| TopLeftCorner$_v$ |
| BoxWidth |
| BoxHeight |
| FractionalOccupancy |

Figure 2:
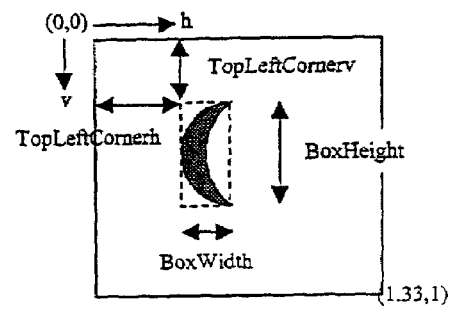
FIG. 2 is an illustrative view of the elements of a feature vector according to the present invention.

As shown in FIG. 2 the position components TopLeftCorner$_h$ and TopLeftCorner$_v$ of the binding box are defined as offsets in horizontal and vertical directions with respect to the origin of the picture, which is nominally at the top-left corner of the image. The FractionalOccupancy is a number between 0 and 1. This is the fraction of samples in the binding box that belong to the object being described. In order to describe TopLeftCorner$_h$, TopLeftCorner$_v$, BoxWidth and BoxHeight, a normalized coordinate system is used. In this system the height of the image when displayed is normalized to 1.0. Subsequently, the display width is measured in units of display height. As an example, for a 320×240 image that uses square pixels for display, the height of 240 pixels is mapped to 1.0, and the width of 320 is mapped to 1.333 (320/240).

| An example feature vector is | \| 0.43 \| |
|---|---|
| | \| 0.51 \| |
| | \| 0.22 \| |
| | \| 0.25 \| |
| | \| 0.83 \| |

Low level queries served by this feature vector include:
1. Find the visual objects that have a particular aspect ratio (ratio of height to width).
2. Find the visual objects that are at least x % (a given percentage) of the picture size.
3. Find the visual objects that are at most x % (a given percentage) of the picture size.
4. Find the visual objects that are positioned near (x,y) (a particular coordinate) location in the picture.
5. Find the visual objects that are at least x % (a given percentage) dense.
6. Find the visual objects that are at most x % (a given percentage) dense.
7. Find the visual objects that have at least "y" units height.

8. Find the visual objects that have at most "y" units height.
9. Find the visual objects that have at least "x" units width.
10. Find the visual objects that have at most "x" units width.
11. Estimating the trajectory of a particular visual object in time, in a given video.

Figure 3:
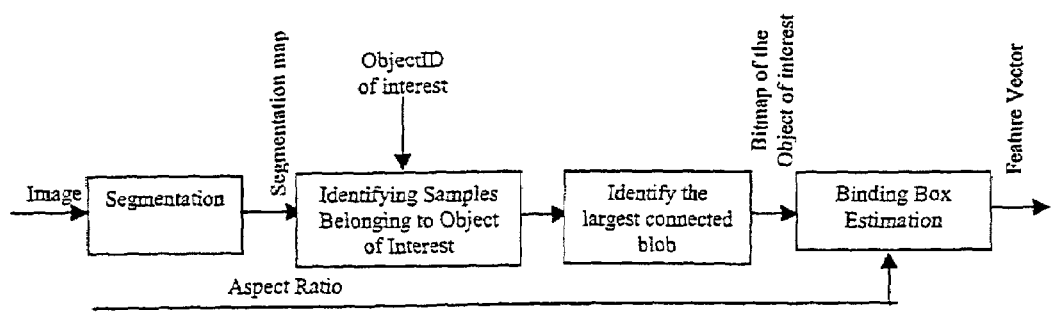
FIG. 3 is a block diagram view of a feature vector extraction process according to the present invention.

Overall extraction of a coarse representation of a visual object's shape is shown in FIG. 3. The steps involved are (1) segmentation, (2) extraction of the bitmap of object of interest, and finally (3) estimation of the binding box. In this figure, the segmentation process may either be automatic, semi-automatic, or. The segmentation map consists of segmentation labels at each pixel. The set of pixels having a particular segmentation label belong to a distinct visual object. Thus, the second stage merely creates a binary map, with values "valid" (true, 1, or 255) wherever segmentation label equals an objectID of interest, and "invalid" (false, or 0) elsewhere. Identification of the largest connected region in the bitmap is covered in co-pending provisional U.S. Patent Application Ser. No. 60/118,386, The binding box estimation procedure gets as input the bitmap indicating the validity of each pixel and the display aspect ratio that is right for the picture.

The process of estimating the binding box itself may be broken down as:
1. Estimating in pixel units the TopLeftCorner$_h$, TopLeftCorner$_v$, BoxWidth, BoxHeight, and FractionalOccupancy.
2. Normalizing the units.

The estimation of TopLeftCorner$_h$, TopLeftCorner$_v$, BoxWidth, BoxHeight, and FractionalOccupancy is performed by the following C++ code segment. The inputBitmap is a 2-D array that contains the validity of each sample (i.e. does it belong to the object of interest or not) information.

```
int botRightv, botRighth;
int i, j, nr, nc, nSamples=0;
occupancy=0;
boxWidth=boxHeight=topLeftv=0;
topLefth=botRightv=botRighth=0;
bool valid;
nr=imageHeight;
nc=imageWidth;
// topLeftv
  valid=false;
  for (i=0; i<nr; i++) {
    for (j=0; j<nc; j++) {
      if (inputBitmap[i][j] is valid) {
        valid=true;
        break;
      }
    }
    if (valid) break;
  }
  topLeftv=i;
//topLefth
  valid=false;
  for (j=0; j<nc; j++) {
    for (i=0; i<nr; i++) {
      if (inputBitmap[i][j] is valid) {
        valid=true;
        break;
      }
    }
    if (valid) break;
  }
  topLefth=j;
//botRightv
  valid=false;
  for (i=nr-1; i>=0; i--) {
    for (j=0; j<nc; j++) {
      if (inputBitmap[i][j] is valid) {
        valid=true;
        break;
      }
    }
    if (valid) break;
  }
  botRightv=i;
//botRighth
  valid=false;
  for (j=nc-1; j>=0; j--) {
    for (i=0; i<nr; i++) {
      if (inputBitmap[i][j] is valid) {
        valid=true;
        break;
      }
    }
    if (valid) break;
  }
  botRight=j;
  for (i=topLeftv; i<=botRightv; i++)
  for (j=topLefth; j<=botRighth; j++)
    if (inputBitmap[i][j] is valid) nSamples++;
  if (nSamples>0) {
  boxHeight=botRightv-topLeftv+1;
  boxWidth=botRighth-topLefth+1;
  occupancy=double(nSamples)/double(boxHeight* boxWidth);
  }
```

Display aspect ratio (DAR) is the ratio of the height of the displayed picture to the width of the displayed picture, say in meters. For example, it is 3/4 for conventional TV, 9/16 for HDTV. Given the estimated results (from above) that are in pixel units, the following relations may be used to perform normalization of the units.

NormBoxHeight=PixelBoxHeight/Pixel Picture Height

NormBoxWidth=PixelBoxWidth/(PixelPictureWidth*DAR)

NormTopLeftCorner$_v$=PixelTopLeftCorner$_v$/PixelPictureHeight

NormTopLeftCorner$_h$=PixelTopLeftCorner$_h$/(PixelPictureHeight*DAR)

NormFractionalOccupancy=PixelFractionalOccupancy

Figure 4:
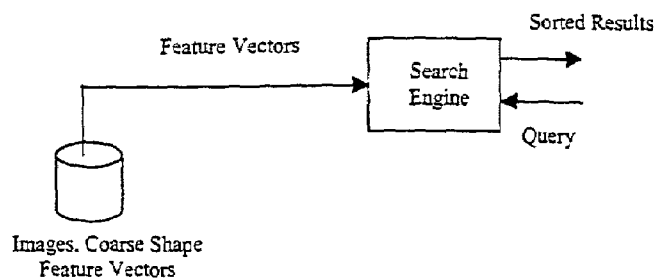
FIG. 4 is a block diagram view of a search engine based upon coarse shape feature vectors.

Once the feature vectors are available for each visual object in each image of the database, it is quite trivial to perform a matching/query process based on the queries listed above. A search engine shown in FIG. 4 compares the query number to the appropriate element of the feature vectors, and performs sorting to pick the best matches. In these searches, the search engine needs additional metadata: the display aspect ratio, width and height in pixels.

Here details are provided for the particular query "Find the visual objects that have an aspect ratio (ratio of height to width) of A". In response to this query, the search engine:
1. Computes the aspect ratios ($\alpha_i$) of all the visual objects in the database (i.e. ratio of BoxHeight to BoxWidth), 2. Computes the Euclidean distance $d_i$ from $\alpha_i$ to A for each i. Other distance metrics are also possible.

$$d_i = |A - \alpha_i|$$

3. Sorts $d_i$ in descending order.
4. Presents the top results in the sorting to the user who made the query.

The search engine can pre-compute a lot of information to speed-up the search.

Thus the present invention provides a coarse representation of a visual object's shape for search/query/filtering applications by representing each object by a binding box.

What is claimed is:

1. A method of coarse representation of a shape of a visible object in a digital picture comprising the steps of:
   segmenting visible objects from the digital picture;
   extracting a bitmap for an object of interest from the segmented visible objects; and
   estimating from the bitmap a display aspect ratio and a binding box for the object of interest, wherein said estimation step additional comprises
      estimating in pixel units a set of parameters for the binding box; and
      normalizing the pixel units to form a feature vector representing the binding box;
   searching a video database having visible objects, each visible object having an associated feature vector, as to find those objects whose feature vectors match the feature vector of the object of interest; wherein said searching step additionally comprises
      computing aspect ratios for all visible objects in the video database;
      computing distances according to a specified distance metric between the desired aspect ratio and the aspect ratios for the visible objects in the video database;
      sorting the distances in descending order to produce a sort list of aspect ratios and associated visible objects; and
      displaying the visible objects associated with the aspect ratios that are at the top of the sort list.

* * * * *